Nov. 9, 1971  C. S. BASSIN  3,618,157
YARD CLEANING MACHINE
Filed Dec. 8, 1969  3 Sheets-Sheet 1

INVENTOR
CHARLES S. BASSIN
BY Kenwood Ross &
Chester E. Flavin
ATTORNEYS.

INVENTOR.
CHARLES S. BASSIN
BY Kenwood Ross &
Chester E. Flavin
ATTORNEYS.

United States Patent Office 3,618,157
Patented Nov. 9, 1971

3,618,157
YARD CLEANING MACHINE
Charles S. Bassin, 87 Primrose Drive,
Longmeadow, Mass. 01106
Filed Dec. 8, 1969, Ser. No. 882,929
Int. Cl. A471 5/14
U.S. Cl. 15—330           1 Claim

ABSTRACT OF THE DISCLOSURE

A blower apparatus for maintaining lawn and related areas which is convertible to a vacuum apparatus by the substitution of a hose or a vacuum snout for a protective cover at the air inlet of the fan housing and by the connection of a refuse collection bag or transfer hose at the air outlet of the fan housing, the fan or blower housing being rotatable about the impeller axis so as to locate the air outlet in any desired position of rotative adjustment.

BACKGROUND OF THE INVENTION (1) Field of the invention

Lawn maintaining apparatus in the nature of combination blowers and vacuums.

(2) Description of the prior art

Nowhere in the prior art is there a lawn blower having a rotatable blower housing which may be quickly and easily converted to a lawn vacuum and vice versa and without the need for any special tools or special skills.

SUMMARY OF THE INVENTION

The invention provides simple, inexpensive means for converting a lawn blower to a lawn vacuum, and vice versa, all without the use of special tools or the need for special skills.

It provides a rotatable blower housing whereby the air outlet port may be placed at any position of rotative adjustment from 0° to 360°.

It has been customary, in lawn cleaning equipment, to provide a lawn blower to blow leaves, grass cuttings and other debris into a pile or piles for easy collection by a lawn vacuum, which picks up the debris and deposits it in a suitable refuse collection bag. Except for landscaping firms and large commercial establishments, the costs of purchasing and maintaining two such machines is prohibitive, wherefore the individual is usually restricted to purchasing one or the other of the machines.

A lawn blower and a lawn vacuum have certain features of construction in common. Each includes a fan or impeller rotatable in a housing, the housing having air inlet and outlet openings.

In a lawn blower, air is drawn through the inlet opening, which normally is protected by a cover, and passed tangentially or forwardly outwardly from the housing in the form of an air blast to blow the leaves into a pile.

In a lawn vacuum, a hose is connected to one face of the housing and a refuse collection bag is connected tangentially to one side thereof so that dirt and debris are sucked through the hose, and expelled by the fan from the housing into the collection bag.

I provide for easy conversion of a blower to a vacuum, and vice versa, by releasably attaching the protective cover to the housing at the air inlet so that it may be quickly and easily replaced by a vacuum hose or vacuum snout and by providing an adapter for the air outlet of the housing so that a refuse collection bag or transfer hose may be readily and releasably attached to the housing.

I also mount the blower housing for rotation about the impeller axis so that the air outlet may be aimed to the side or upwardly or downwardly, as desired.

DESCRIPTION OF THE PREFERRED EMBODIMENTS

The basic lawn blower is a wheeled, motorized unit having a blower housing which encloses a rotatable fan or impeller, the housing having an air inlet opening and an air outlet chute or conduit therein at one side thereof. Air is swept into the housing through the inlet and outwardly therefrom through the outlet by the rotating fan. A deflector is usually provided at the outlet so that the air blast may be deflected laterally outwardly or forwardly relative to the blower.

In each embodiment herein shown and described, air is drawn through a protective cover and inlet opening into the interior of the housing, where it is swept in a circular path by the fan so as to be expelled from the housing through an air outlet opening 29 tangentially-disposed at the lower side of the housing and surrounded by an air outlet conduit 30.

Figure 1:
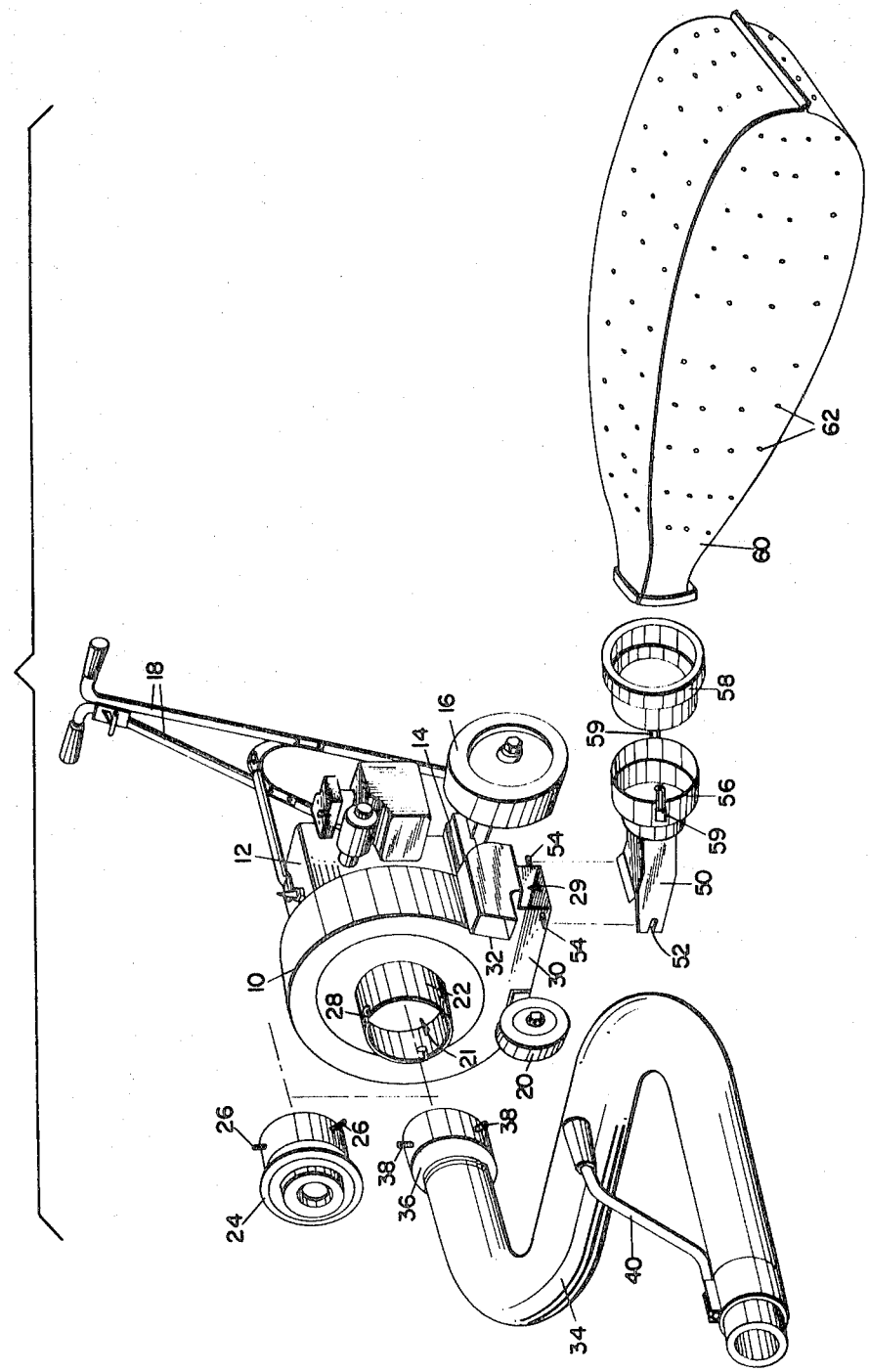
FIG. 1 is an exploded, perspective view of yard cleaning apparatus incorporating a preferred form of the invention.
Figure 2:
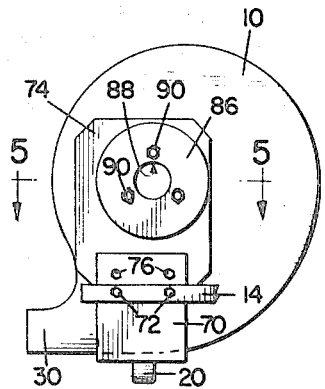
FIG. 2 is a rear elevational view of the blower housing and its mounting.
Figure 3:
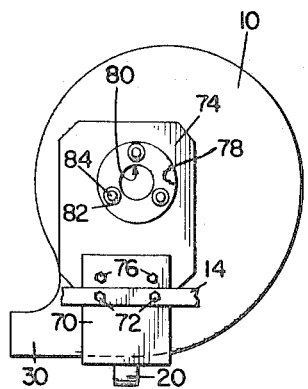
FIG. 3 is a view similar to FIG. 2 with the ring retainer removed.
Figure 4:
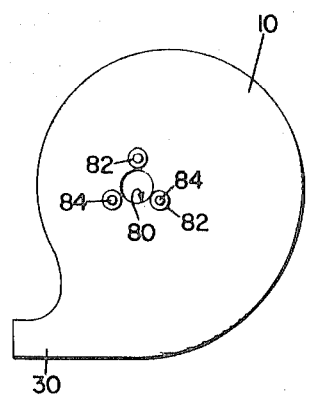
FIG. 4 is a rear elevational view of the blower housing only.
Figure 5:
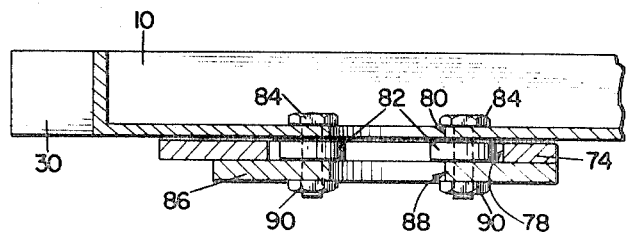
FIG. 5 is an enlarged, fragmentary cross-sectional view taken on line 5—5 of FIG. 2.

Air outlet conduit 30 may have an elbow-like deflector 32 hinged thereto. When this deflector is raised, as shown in FIG. 1, the air blast passes directly outwardly from the housing through the outlet opening and outlet conduit so as to blow in a direction normal to the path of movement of the blower, or to the side of the blower.

When the deflector is lowered, it deflects the air blast to the front of the blower.

An annular blower housing 10 encloses an impeller or fan, not shown, the fan being driven by a gasoline engine 12 and the whole being supported relative to a frame 14 mounted upon wheels 16, the frame being guided and propelled by handle members 18.

The blower housing is preferably additionally supported by a forward guide wheel 20, which may be removably and vertically adjustably mounted relative to the housing and which may or may not swivel.

An air inlet opening 21 is provided centrally of the forward face of the housing, and, as in FIG. 1, the inlet opening is circumscribed by an air inlet conduit 22.

An annular protective cover 24 is disposed in conduit 22 to preclude the insertion of the hands or other objects into the path of the rotating fan within the housing.

In the FIG. 1 embodiment, the protective cover is releasably connected to the conduit as by locking tongues 26 on the cover receivable in locking slots 28 in the conduit.

Figure 7:
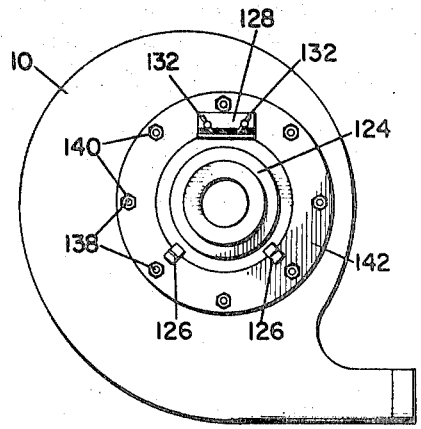
FIG. 7 is a front elevational view of the blower housing and showing a modified form of protective cover.

In the FIG. 7 embodiment, the conduit is omitted and a cover 124 is releasably connected directly to the forward face of the housing as by a pair of offset brackets 126 and a clamp 128, the cover being supported at its lower peripheral edge by the brackets and being retained at its upper peripheral edge by the clamp, which is sleeved upon a pair of studs 130 having wing nuts 132 threadedly engaged thereupon.

Optionally, a hose, not shown, may be releasably connected either to outlet conduit 30 or to deflector 32 so that the air blast may be aimed under shrubs, bushes or the like.

To convert the above-described blower into a vacuum, cover 24 is removed and a vacuum hose or vacuum snout inserted in its place, and deflector 32 is raised and an adapter carrying a refuse collection bag or a transfer hose is releasably attached to the air outlet conduit.

In the FIG. 1 embodiment, the vacuum hose, indicated at 34, has a collar 36 at one end thereof receivable in air inlet conduit 22 of the housing, the collar having locking tongues 38 receivable in the locking slots 28 of the conduit for releasably connecting the hose to the housing. A handle 40 is optionally provided at the opposite end of the hose to facilitate aiming movement.

Figure 8:
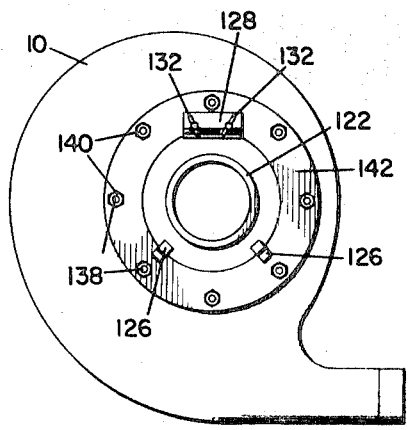
FIG. 8 is a front elevational view of the blower housing and showing a modified form of hose coupler.
Figure 10:
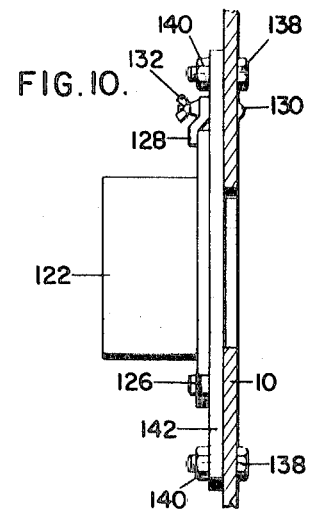
FIG. 10 is an end elevational view as seen from the right of FIG. 8, a sectional showing of the front wall of the blower housing only being made.

In the embodiment of FIGS. 7, 8 and 10, cover 124 is removed, and an inlet conduit 122 substituted therefor, the inlet conduit being releasably connected to the forward face of the housing by the offset brackets 126 and a clamp 128. In this instance, the end of the vacuum hose, not shown, is sleeved directly on the conduit.

Figure 9:
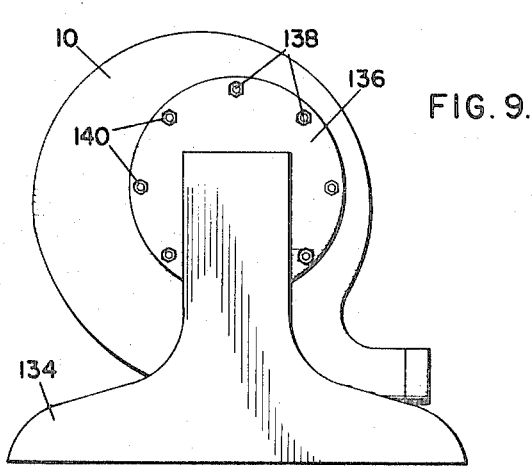
FIG. 9 is a front elevational view of the blower housing and incorporating a vacuum snout.

In the FIG. 9 embodiment, a vacuum snout 134 is used in lieu of a hose, the vacuum snout having an integral mounting plate 136 which is secured directly to the forward face of the housing as by bolts 138 having nuts 140 threaded thereon. Herein, guide wheel 20 is removed and a mounting plate 136 is substituted for the mounting plate 142 used in the FIGS. 7, 8 and 10 embodiments and also secured directly to the forward face of the housing as by bolts 138 and nuts 140.

The adapter, indicated at 50, is slideably receivable on air outlet conduit 30, the adapter being slotted at one of its ends as at 52 for the reception therein of locking lugs 54 provided on the outlet conduit.

Figure 11:
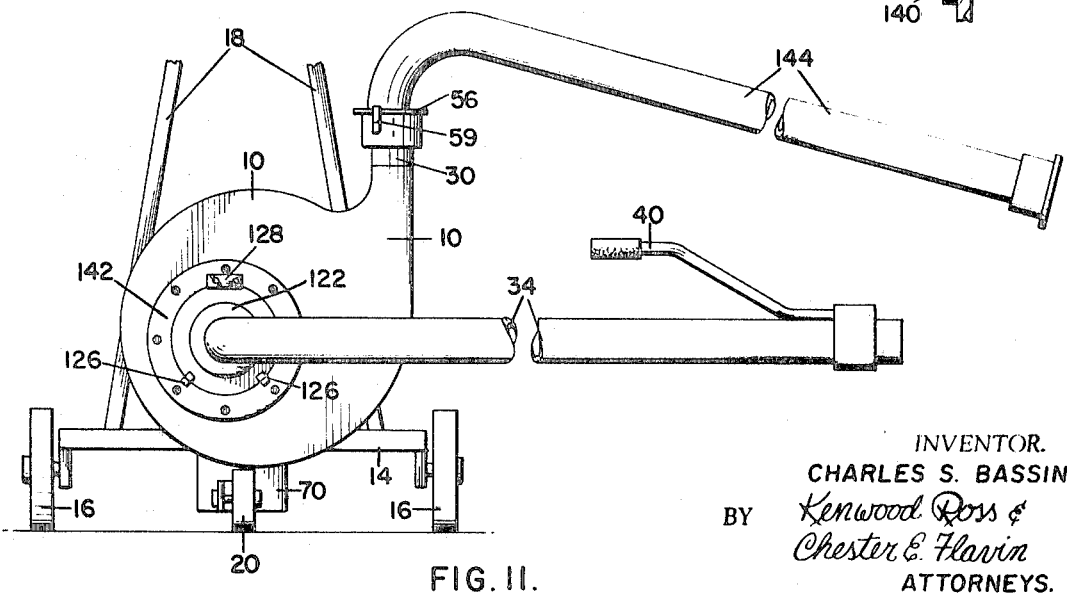
FIG. 11 is a fragmentary, front elevational view of another modified form of yard cleaning apparatus, including a transfer hose for transferring debris to a distant collection point when the apparatus is used as a vacuum.

A collar 56 at the opposite end of the adapter mates with a locking ring 58 and is releasably fixed to the locking ring by such as quick release hook fasteners 59 to secure the neck of a refuse collection bag 60, as shown in FIG. 1, or a transfer hose 144, as shown in FIG. 11, to the adapter and, thus, to the housing.

Bag 60 is preferably formed from a light-weight plastic or canvas and may optionally be provided with plurality of small openings 62 therein which permit air escape while retaining dirt and debris within the bag.

Transfer hose 144 is preferably formed from a lightweight plastic and will be of any desired length, wherefore debris, grass cuttings and the like, as picked up by the vacuum attachment, may be transferred through the transfer hose to a remote location such as into a trash receptacle or into a truck or other waste vehicle.

When the apparatus is used as a vacuum, the rotating fan creates a vacuum to draw dirt and debris through the open mouth of the hose or vacuum snout and into the housing through air inlet 21. It is then expelled from the housing by the fan through air outlet opening 29, outlet conduit 30, and adapter 50 and into bag 60 or transfer hose 144.

The apparatus is quickly and easily reconverted from a vacuum to a blower by removing hose 34 or vacuum snout 134 from inlet conduit 22 and replacing it with cover 24 and removing adapter 50 and bag 60 or hose 144 from outlet conduit 30 on housing 10.

The blower housing is mounted for rotation about the impeller axis so that the outlet conduit may be placed at any position of rotative adjustment from 0° to 360°.

As shown in FIGS. 2–5, guide wheel 20 is rotatably mounted relative to a support plate 70 which extends upwardly adjacent the rear face of blower housing 10 and is fixed to frame 14 as by bolts 72. The guide wheel is also removably and vertically adjustably mounted relative to the support plate.

A bearing plate 74 fixed to the upper end of support plate 70 as by bolts 76 extends upwardly from the support plate and has an annular bearing opening 78 which is concentric with and circumscribes an impeller opening 80 in the rear wall of the blower housing.

A plurality of rollers 82 is rotatably mounted relative to studs 84 which extend rearwardly from the blower housing rear wall adjacent impeller opening 80, the rollers 20 being positioned as to extend into bearing opening 78 of plate 74 and to be rideable along the wall defined by the opening wherefore the blower housing is freely rotatable relative to the bearing plate.

A retainer ring 86 is positioned flush against the rearwardly facing face of the bearing plate and has an opening 88 therein concentric with impeller opening 80 in the blower housing to permit the passage of the impeller shaft, not shown, therethrough.

Roller studs 84 pass through provided openings in the retainer ring and have nuts 90 threaded thereon, wherefore the blower housing is rotatably fixed relative to the bearing plate.

Figure 6:
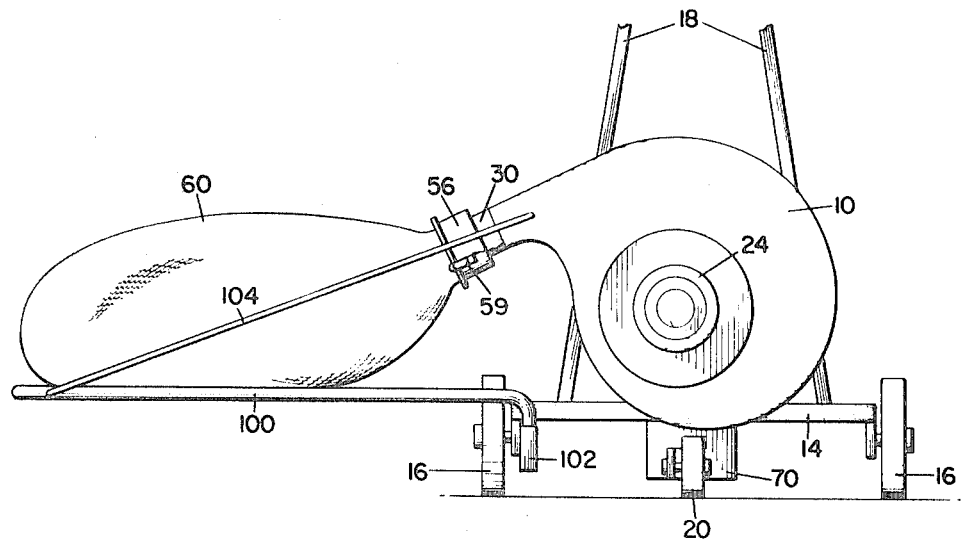
FIG. 6 is a fragmentary, front elevational view of a modified form of yard cleaning apparatus, including a side bracket for supporting the collection bag.

In the FIG. 6 form, the machine has been modified by the addition of a collection bag rack 100 for supporting the bag upwardly of the ground to materially reduce wear and tear thereof.

The rack is releasably engageable in brackets 102 fixed to frame 14 and is used only when the machine is employed as a vacuum necessitating the use of the collection bag.

The rack extends horizontally outwardly from the brackets at one side of the machine and is supported at its outer end by support wires 104 which extend between the rack and the blower housing.

In FIG. 6, the blower housing has been rotated so that discharge outlet 30 is pointing angularly downwardly toward rack 100, which supports the collection bag.

In FIG. 11, the blower housing has been rotated so that discharge outlet 30 is pointing straight upwardly, wherefore transfer hose 144 may more easily be directed to the desired receptacle.

I claim:

1. A yard cleaning machine convertible for use as a lawn blower or as a lawn vacuum comprising:
   a wheeled machine frame;
   a fan;
   an annular housing enclosing the fan and mounted on the machine frame;

the housing having air inlet and outlet openings therein;

means mounting the housing for free 360° rotative movement relative to the machine frame about the fan axis comprising a plurality of rollers on the housing freely rotatable relative to a fixed race on the machine frame;

means for rotating the fan;

a vacuum attachment;

a refuse attachment;

means for optionally and releasably connecting the vacuum attachment to the housing at the air inlet opening; and means for optionally and releasably connecting the refuse attachment to the housing at the air outlet opening.

References Cited

UNITED STATES PATENTS

| | | | |
|---|---|---|---|
| 1,596,446 | 8/1926 | Nelson | 15—331 UX |
| 2,085,042 | 6/1937 | Replogle | 15—351 |
| 2,598,499 | 5/1952 | Breuer et al. | 15—405 X |
| 2,669,078 | 2/1954 | Gregory | 56—501 |
| 3,112,511 | 12/1963 | Lakenau | 15—350 |
| 3,241,173 | 3/1966 | Finn | 15—328 |

FOREIGN PATENTS

| | | | |
|---|---|---|---|
| 412,894 | 7/1934 | Great Britain | 15—351 |

DANIEL BLUM, Primary Examiner

U.S. Cl. X.R.

15—331, 350; 56—202; 417—231